United States Patent [19]

Anders

[11] 4,113,546
[45] Sep. 12, 1978

[54] APPARATUS FOR PRODUCING TUBES BY HELICALLY WINDING SHEETS

[75] Inventor: Dietmar Anders, Hanover, Fed. Rep. of Germany

[73] Assignee: Hermann Berstorff Maschinenbau GmbH, Hannover-Kleefeld, Fed. Rep. of Germany

[21] Appl. No.: 786,859

[22] Filed: Apr. 12, 1977

[30] Foreign Application Priority Data

Mar. 17, 1976 [DE] Fed. Rep. of Germany ....... 2617140

[51] Int. Cl.² ........................................... B65H 81/00
[52] U.S. Cl. .................................. 156/431; 156/195; 156/498; 156/500; 156/244.13
[58] Field of Search ............... 156/425, 428, 432, 195, 156/143, 498, 244; 165/90, 120

[56] References Cited

U.S. PATENT DOCUMENTS

| | | | |
|---|---|---|---|
| 2,777,501 | 1/1957 | Fisher | 156/432 |
| 2,823,154 | 2/1958 | Archer | 156/498 X |
| 3,118,800 | 1/1964 | Snelling | 156/244 |
| 3,159,515 | 12/1964 | Dunlap et al. | 156/498 X |
| 3,173,822 | 3/1965 | Rigaut | 156/143 X |
| 3,237,685 | 3/1966 | Heisterkamp | 165/90 |
| 3,301,734 | 1/1967 | Britton et al. | 156/498 X |
| 3,399,095 | 8/1968 | Hyland | 156/244 X |
| 3,532,588 | 10/1970 | Kanao | 156/428 X |
| 3,756,890 | 9/1973 | Galloway et al. | 156/244 X |
| 3,910,808 | 10/1975 | Steward | 156/498 X |
| 4,010,054 | 3/1977 | Brandt | 156/429 X |

Primary Examiner—David A. Simmons
Attorney, Agent, or Firm—Donald D. Jeffery

[57] ABSTRACT

Apparatus for producing tubes by helically winding strips of thermoplastics synthetic sheet material, comprising a double-shell coolable draw-off mandrel onto which, immediately after its extrusion through a slit nozzle or after being heated to a workable state, the sheet material is wound spirally in overlapping manner in such a way that it is formed into a tube with an obliquely extending winding seam, pull-off apparatus to cause and permit axial and rotational movement of the tube relative to the draw-off mandrel and cooling means to act directly on the sheet material wound into a tube on the draw-off mandrel. The double-shell draw-off mandrel can be cooled by liquid coolants circulating through a closed cooling system and between inner and outer shells of the mandrel. Conveyors extending longitudinally of the mandrel and laterally overlapping with one another can be provided to reduce friction between the tube and the mandrel. The pull-off apparatus may comprise a rotatable housing mounting caterpillars and surrounding the mandrel. A further extruder can be provided to extrude a further strip of material onto the tube to form outer layers of the tube and reinforcing material can be incorporated in the tube.

22 Claims, 4 Drawing Figures

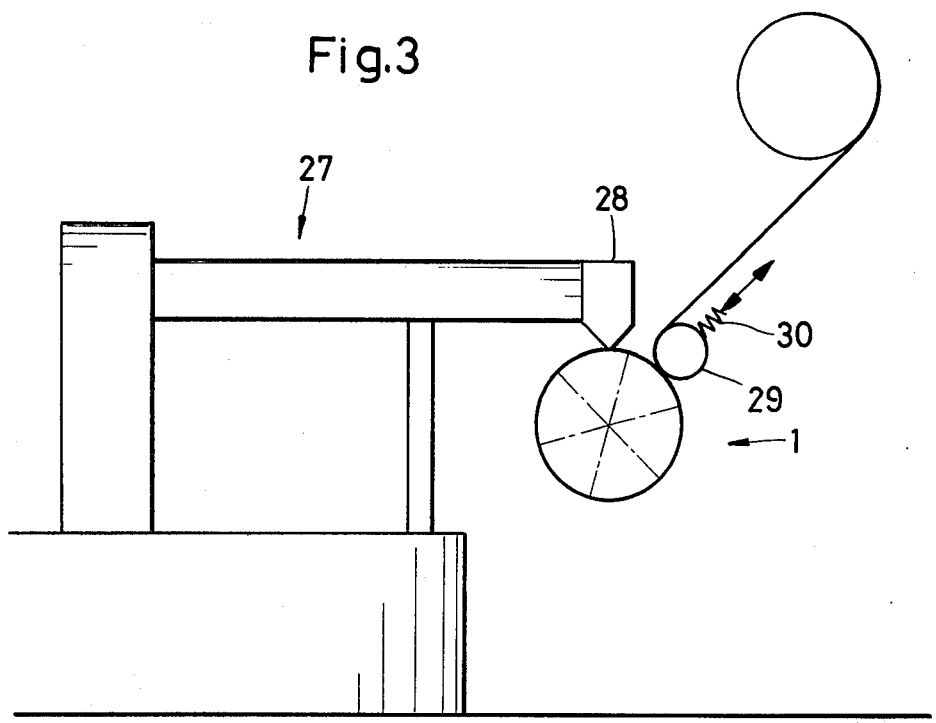
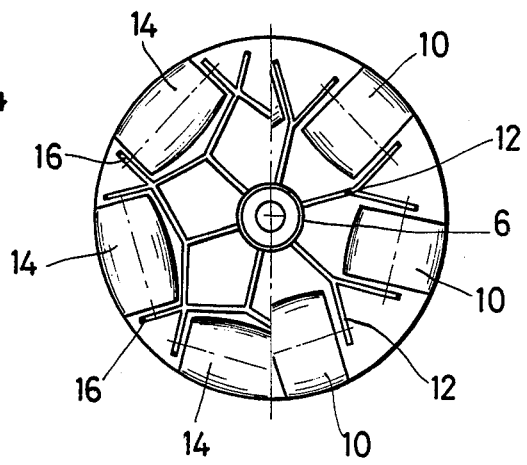

APPARATUS FOR PRODUCING TUBES BY HELICALLY WINDING SHEETS

The invention relates to apparatus for producing tubes by helically winding strips of thermoplastics synthetic sheet material whereby, immediately after emerging from an extrusion slit nozzle or after being re-heated to a workable state, the sheet material is wound onto a mandrel with an overlapping obliquely extending winding seam.

Hitherto, large tubes with a diameter of 1,000 mm and a wall thickness of 32 mm for a nominal pressure of 3.2 bars over-pressure could be produced at a maximum rate of 0.09 m/min., corresponding to 520 kg/hr. Such a production rate from plant which cells for high investment in terms of buildings and machinery, is quite unsatisfactory, particularly since extruders are readily available with substantially higher rates of output.

The particular difficulty and thus the limit on the rate of output lies in the cooling and calibration of the tubes. Usually a draw mandrel maintains within the tube an over-pressure which presses the tube wall against a cooling collar downstream of the head. It is only externally cooled and by virtue of the poor heat conductance of the synthetic plastics material, it takes a long time for the walls to be cooled sufficiently to be externally stable in form and thus allow subsequent cooling with water.

The extent of the calibrating apparatus is subject to close limits, since wall friction and internal pressure mean that draw-off forces become so high that they cannot be transmitted via the only partially cooled synthetic plastics tube.

The disadvantages of production installations according to the state of the art are in particular the extremely low rate of production for a high space and investment requirement of the overall installation and therefore high processing costs.

By reasons of the force of gravity in a batch of molten synthetic material plasticised by extruders, during tube production, synthetic plastics material flows within the gap and particularly within the calibrating apparatus, so that if one does not work from the outset with an eccentric mandrel in the tube head, the wall thicknesses at the bottom will be greater. The centering of the injection tools of this size is however very time-consuming and difficult and must be corrected according to the extrusion temperature and the viscosity of the material.

It has also been proposed to wind tubes of relatively large diameter, which is done on hitherto known installations intermittently, i.e. only over a fixed length of mandrel. The extruder or the mandrel will thereby travel axially over the production length. The disadvantage of such a method is the intermittent nature of the operation and the very long stoppage time required to pull the complete tube off the mandrel and the limitation to the fixed length determined by the maximum mandrel length.

The invention has among its objects to provide apparatus for the continuous manufacture of tubes by helically winding sheets of synthetic thermoplastics material, particularly large tubes, and which does not have the above-mentioned disadvantages, and whereby the apparatus for producing the tubes permits of a high rate of output, and produces tubes having a very high tension and compression strength. Furthermore, the apparatus can offer opportunities of strengthening the tubes by for example glass fibre gauze or metal.

According to the invention there is provided apparatus for producing tubes by helically winding strips of thermoplastics synthetic sheet material, comprising a double-shell coolable draw-off mandrel onto which, immediately after its extrusion through a slit nozzle or after being heated to a workable state, the sheet material is wound spirally in overlapping manner in such a way that it is formed into a tube with an obliquely extending winding seam, pull-off apparatus to cause and permit axial and rotational of the tube relative to the draw-off mandrel and cooling means to act directly on the sheet material wound into a tube on the draw-off mandrel.

Preferably there is provided in combination internal cooling by means of the double-shell coolable draw-off mandrel and external cooling, by means of a cooled pressure-applying roller or an air knife operating with cooled air, disposed immediately downstream of the extrusion slit nozzle and to press the extruded sheet onto the pull-off mandrel, and a separate cooling arrangement acting directly on the outer periphery of the wound tube. With such cooling apparatus, considerably higher production speeds are possible than hitherto. Since the individual, e.g. 2 mm thick, sheets are cooled from for instance 220° to 140° by the cooling roller already at the onset of winding, the subsequent all-round action of the external cooling apparatus need only cool the e.g., 32 mm thick tube which does not readily conduct heat, from for example 140° to 50° C.

Preferably the conveyor belts disposed on the pull-off mandrel convey the extruded and wound tube axially. With such an arrangment the length of the cooling mandrel is not limited by friction considerations, so providing a further opportunity of increasing the rate of production.

Various tube diameters can be produced with the same broad nozzle, so particularly heavy and expensive precision tools are not required.

Since centrifugal force seeks to throw the already extruded wound tube outwardly, it does not shrink so intensely onto the cooling mandrel, so that the pull-off forces required which have to be borne by the partially cooled tube, can be relatively low, i.e. it is possible to pull off at a higher speed. If the shrinkage of the tube diameter is not adequately compensated by the centrifugal action because for example the resultant speed of rotation of the mandrel is too low, then the cooling mandrel can be produced with a diameter which reduces in the direction of pull-off of the tube.

The apparatus provides a reinforcement of the tube by means of glass fibres or synthetic plastics fibres, and it is therefore possible with continuous tube production, considerably to reduce the wall thickness of the tubes, so that it is also possible to achieve savings in terms of thermoplastics material.

Since the extruded tube wound with a multiple overlap is held on the draw-off mandrel, it is possible to allow the intensive water cooling to act via the cooling apparatus disposed peripherally around the already wound tube, onto the externally still plastic synthetic tube, so that by reason of the intensive cooling, the tube seeks to shrink on the outside, whereby the desired compression pre-tension are created in the jeopardised inner zone of the tube.

The invention is diagrammatically illustrated by way of example in the accompanying drawings, in which:

FIG. 3 is a cross-section taken on line II—II of FIG. 1, through an extruder, through a draw-off mandrel and through stationary unreeling apparatus for tube reinforcement; and FIG. 4 is a cross-section taken on line III—III of FIG. 1, showing inner and outer guide rollers for the endless belt on a draw-off mandrel.

Figure 1:
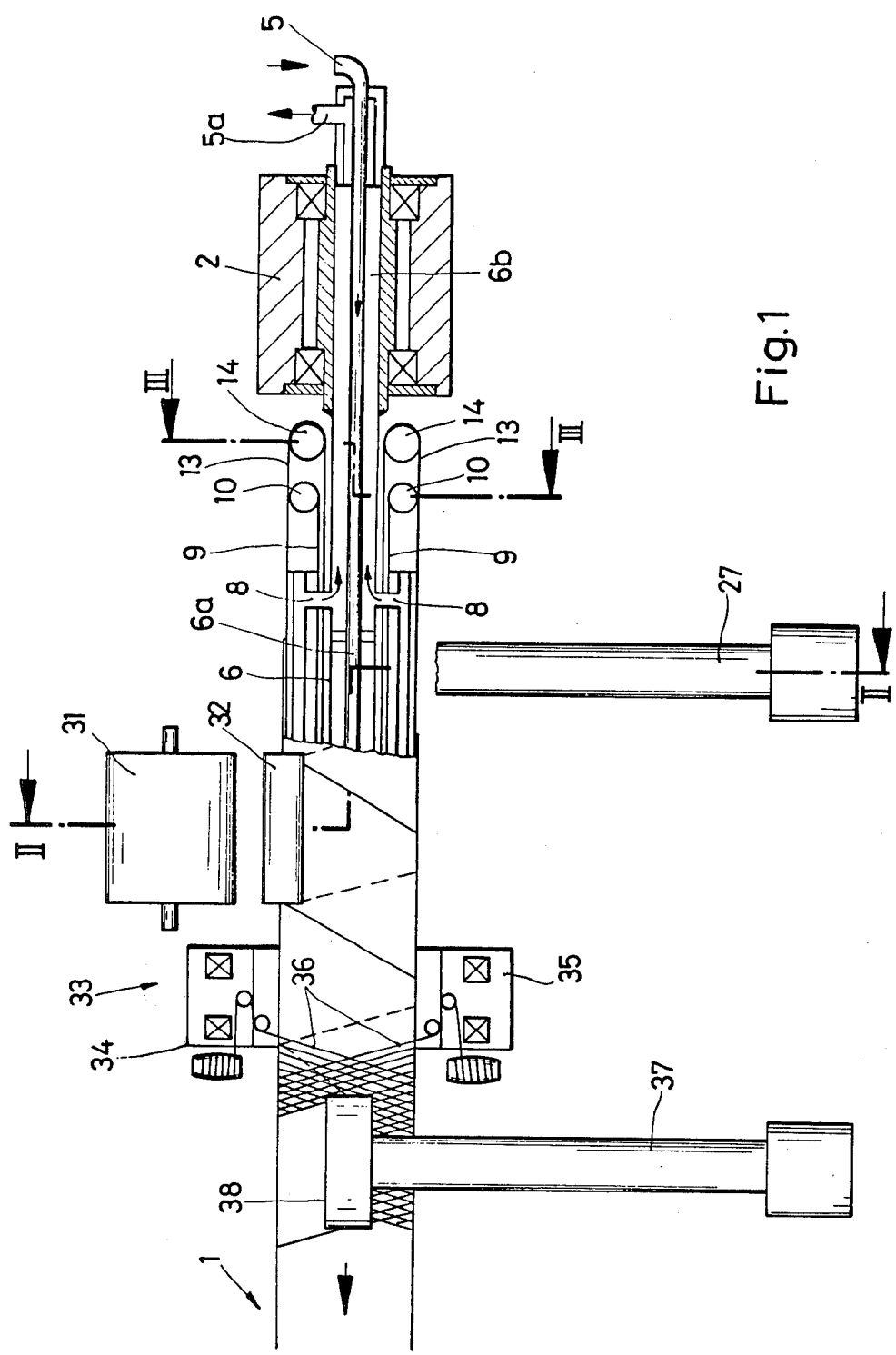
FIG. 1 shows the right-hand part of apparatus for producing tubes according to the invention partially in cross-section from above.
Figure 2:
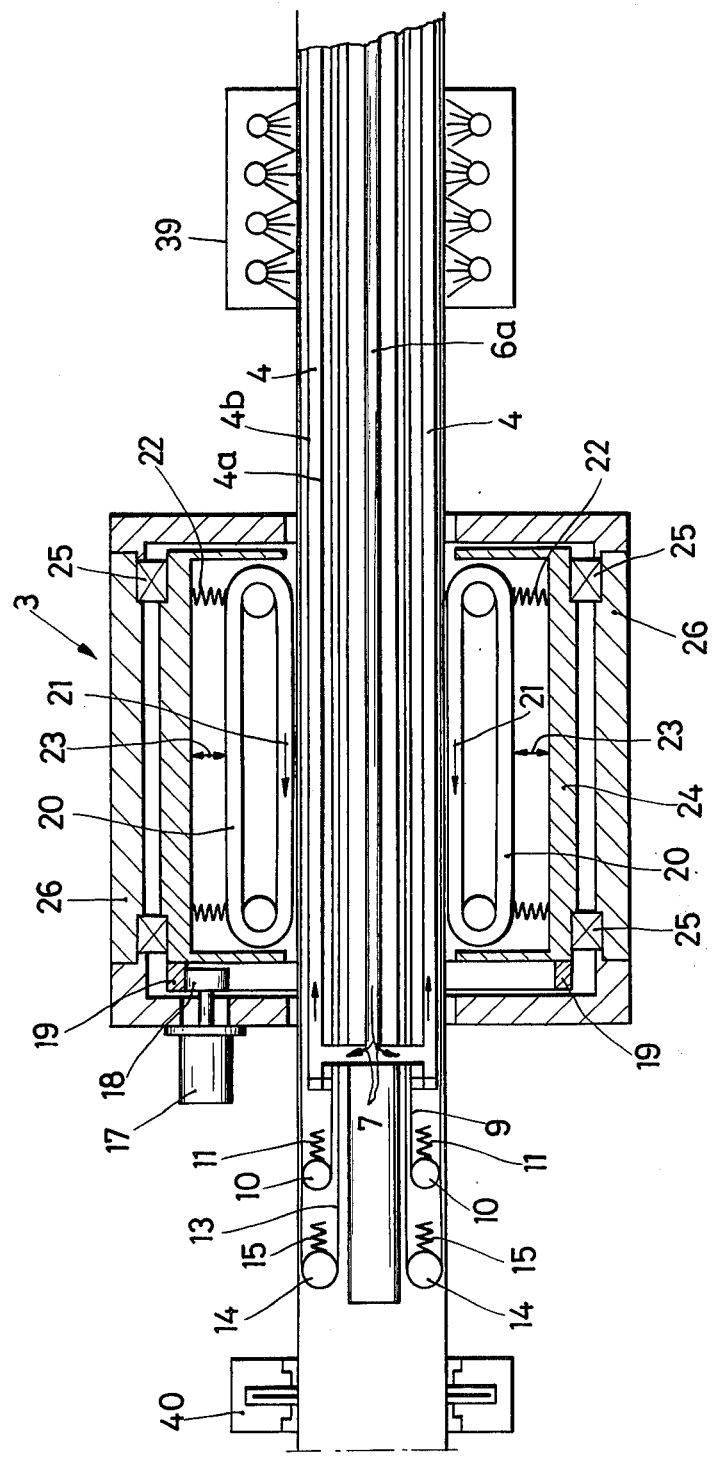
FIG. 2 shows the left-hand part of apparatus for producing tubes immediately adjacent to the right-hand part of FIG. 1.

Referring to the drawings, a draw-off mandrel 1 is mounted in a bearing 2 at one end and in a caterpillar draw-off 3 at the other end. The draw-off mandrel 1 itself comprises a double-shell tube 4 which permits use of a closed cooling system with a continuously circulating cooling medium. The cooling medium enters the draw-off mandrel through a feed tube 5, passes through a central tube 6a located in the centre of the draw-off mandrel 1 to the end of the draw-off mandrel 1 which is remote from the feet tube 5, whence it passes to the double-shell tube 4 by way of hollow spokes 7 radiating out from the centre. After passing through the double-shell tube 4 the cooling medium is fed back through hollow spokes 8 and into an outer central tube 6b before passing to a discharge tube 5a.

Over the double-shell tube 4 run endless inner conveyor belts 9 guided by guide rollers 10. The guide rollers 10 tension an inner endless conveyor belt 9 by means of a tensioning device 11 of known kind to permit a taut guidance of the endless belt 9. The guide rollers 10 are mounted by support means 12 (FIG. 4) which are in turn disposed on the central tube 6.

To ensure that the entire periphery of the double-shell tube 4 is covered by endless tensioned conveyor belts, further inner endless conveyor belts 13 are provided to overlap the belts 9. The conveyor belts 13 are guided by guide rollers 14 which, by means of tensioning devices 15, provide for a taut guidance of the further inner conveyor belts 13. The guide rollers 14 are mounted in support means 15 which are in turn disposed on the central tube 6.

By reason of the fact that the inner endless conveyor belts 9 and the further conveyor belts 13 are provided, it is made possible for the double-shell tube 4 to be covered over its entire periphery by overlapping conveyor belts, so that it can receive the extruded tube without the material of the tube coming into contact with the double-shell tube 4 itself.

It is ideal for the endless conveyor belts 9 and 13 to be made from a material which does not adhere to the material which is to be processed, in order to avoid adhesion to and possible damage to the extruded tube.

The caterpillar draw-off 3 is made to perform a rotary movement by a drive means 17 and a gearwheel 18 which meshes with an internally toothed gear ring 19.

Individual caterpillars 20 of the caterpillar draw-off 3 disposed at peripheral spacings around the double-shell tube 4 are driven by known means, not shown, in the direction shown by arrow 21. The individual caterpillars 20 themselves can be pressed by tensioning means 22 in the direction of and onto the double-shell tube, as is indicated by the arrows 23. The caterpillars 20 of the draw-off 3 are mounted in a tubular shell 24. Bearings 25 are disposed in a stationary tubular housing 26, which holds the entire caterpillar draw-off apparatus 3, so that the tubular shell 24 can be rotated by the drive means 17.

An extruder 27 plasticises the material used for tube production and extrudes it in a width predetermined by a slit extrusion nozzle 28, onto the draw-off mandrel 1. Immediately after emerging the extruded strip of material is pressed by a cooled roller 29 (FIG. 3) or by an air knife working with cooled air, onto the draw-off mandrel 1. During this process, the surface of the extruded material is substantially cooled.

By reason of the rotation of the draw-off mandrel 1, brought about by the drive 17 of the caterpillar draw-off 3, the sheet of synthetic plastic material extruded through the nozzle 28 is wrapped around the mandrel. By reason of the axial movement of the endless conveyor belts 9 and 13, the extruded sheet also undergoes an axial movement. The rotation of and the axial movement of the surface of the draw-off mandrel is so attuned to the rate of output of the extruder that a radial spiral multiple overlap of the extruded sheet of synthetic plastics material results. The synthetic plastics sheet emerging from the slit extrusion nozzle 28 is therefore wrapped in several layers which overlap on the draw-off mandrel. Since the plasticised material is cooled only by the cooling roller 29 or the air knife to a temperature which, although markedly below the mergence temperature, is still higher than the melting point, there is a complete welding of the spirally wound synthetic plastics sheet, produced with the aid of the pressure-applying roller 29, so that a completely sealed synthetic plastics tube is obtained.

Reinforced tubes can also be provided. For example, a glass-fibre mat can be wound onto the synthetic plastics tube located on the draw-off mandrel 1 by means of stationary unreeling apparatus 31. The glass-fibre mat is pressed against the mandrel 1 by a roller 32 and by the rotation of the cooling mandrel itself onto the synthetic plastics tube which is also moving in an axial direction.

For the purpose of further or different reinforcing of the tube already extruded by the extruder 27 and the slit extrusion nozzle 28, an arrangement of crossed-over braid reinforcements can be applied to the tube by means of braiding apparatus 33, comprising two unwinding stations 34 and 35 for, for example, glass threads 36.

By means of a further extruder 37 on which is fitted a slit extrusion nozzle 38, a further sheet of synthetic plastics material can be extruded onto the tube already formed on the cooling mandrel 1 and if necessary can be pressed by a further cooled pressure-applying roller (not shown) so that the reinforcement is covered and is thus sandwiched between inner and outer layers of plastics material in the middle of the thickness wall of the tube. The further extruder 37 can alternatively be used without applying any reinforcement if the output of the first extruder 27 is not sufficient for, for example, tubes of large wall thickness, or if it is intended to produce bonded tubes from two different synthetic plastics material.

In the event of the two synthetic plastics materials used which do not readily adhere to each other, than instead of the reinforcement, it would also be possible to wind a film of melting adhesive onto the inner layer or such a film could be extruded by a separate extruder (not shown) but also having a slit extrusion nozzle.

In order to make tube production cheaper with regard to filler for the synthetic plastics material to be extruded, it is possible to sprinkle onto the inner first wound layer of the tube a thin layer of sand shortly before extruding the second layer of tube onto the first.

For the same quantity of synthetic plastics material, this measure results in a thicker wall for the tube, so considerably improving the stability of the tube produced.

The surface of the tube is subjected to intensive cooling by direct water cooling apparatus 39 disposed with lateral packings around the extruded tube.

The inside face of the tube extruded by the extruder 27 and through the slit extrusion nozzle 28 is likewise subjected to an intensive cooling by the cooling medium circulating in the double-shell tube 4, which acts through the conveyor belts 9 and 13.

Once the tube so produced has been pulled away from the extruders in an axial direction by the caterpillar draw-off 3, has passed over the draw-off mandrel 1 and through the caterpillar draw-off 3 itself, it can be cut to predetermined lengths by a length-cutting apparatus 40.

If, in order to start up the described apparatus for producing tubes, a leader tube is used, the wall thickness of which on the side towards the extruder is reduced from the desired end value to zero over a length corresponding to the width of the slit extrusion nozzle used, and if this leader tube is moved by the caterpillar draw-off 3 in the direction of the extruders 37 and 27, it is also possible to dispense with the conveyor belts 9 and 13. In this case, it is possible directly to extrude onto the cold leader tube or onto the double-shell tube 4 which may be coated with a low friction material such as polytetrafluoroethylene. The axial transport is in this case achieved initially by the leader tube which must extend at least into the caterpillar draw-off 3 and later by the already internally and externally solidified wound synthetic plastics tube which is extruded onto the leader tube. A tube producing plant which is constructed in this way is, in terms of manufacturing costs, substantially more favourable than the above-described plant which has endless conveyor belts 9 and 13 and it does moreover offer an opportunity of subjecting the inside of the synthetic plastics tube extruded spirally onto the double-shell tube 4 to an even more intensive cooling action.

The use of an appropriate leader tube is recommended particularly when producing very thickly-wall tubes. Thin-walled tubes on the other hand can be better produced by using the endless conveyor belts 9 and 13, because the lack of stability of thin-walled tubes may in some circumstances prohibit draw-off by means of the caterpillar draw-off if conveyor belts to act on the inner face of the tube are not used.

An example of the production of tubes by means of apparatus according to the invention is described hereinafter:

The intention is to produce a tube of 1,000 mm diameter and 32 mm wall thickness.

An extruder is used having a screw length of 250 mm × 20 $D$ ($D$ × screw diameter), which permits an output of 2,090 kg/hr.

In order to achieve the required tube wall thickness of 32 mm, in the case of a 2-mm thick layer, 16 layers of material extruded through a slit extrusion nozzle are required and are wound in a spirally overlapping arrangement one over another.

With a nozzle width of 1,600 mm, 16 hundred millimetres of tube would be produced over 16 rotations of the cooling mandrel 1 if the overlap of the wound tube amounts to 100 mm per rotation of the cooling mandrel 1. The cooling mandrel, with a diameter of 1,000 mm, draws off the sheet however at a speed of only 3.6 revolutions/minute. Thus, by reason of the rate of delivery from the extruder and having regard to the dimensions of the tube, the rate of production is 360 mm/min.

A production plant according to the state of the art prior to the invention working with external cooling only and calibration and with draw mandrels, can, being restricted by the slow cooling due to poor heat conductance and limited by the maximum possible pull-off forces over the partially cooled tube, only extrude at a maximum of 520 kg/hr. at a speed of 90 mm/min.

What is claimed is:

1. Apparatus for producing tubes by helically winding strips of thermoplastics synthetic sheet material, the combination comprising a double-shell coolable draw-off mandrel onto which said sheet material at a temperature at which it is fusible is wound spirally in overlapping manner in such a way that it is formed into a tube with an obliquely extending winding seam, pull-off apparatus to cause and permit axial and rotational movement of said tube relative to said draw-off mandrel, first inner endless conveyor belts movable axially in relation to said draw-off mandrel, extending in the longitudinal direction around an outer shell of said draw-off mandrel and tensioned by a tensioning device, second inner endless conveyor belts overlapping said first inner conveyor belts and extending in the longitudinal direction on the outer shell and tensioned by tensioning means, said first and said second inner endless conveyor belts being movable axially with respect to the draw-off mandrel, guide rollers within said draw-off mandrel to feed back said first and said second inner endless conveyor belts, said first and said said second inner endless conveyor belts being driven by said pull-off apparatus directly or by way of said tube extruded thereon, and cooling means to act directly on said sheet material wound into said tube.

2. The invention claimed in claim 1, wherein said double-shell coolable draw-off mandrel is rotatably mounted, comprises an inner shell and an outer shell with a space therebetween and is supported on a central tube by hollow spokes, said central tube is constructed as a double tube, comprising an inner tube and an outer tube, said inner tube is connected to a coolant feed tube and said outer tube is connected to a coolant discharge tube, said inner tube communicating through first ones of said hollow spokes with said space and said space communicating through second ones of said hollow spokes with said outer tube of said central tube and said coolant discharge tube.

3. The invention claimed in claim 1, wherein said cooling means is a coolable roller which can be pressed against said draw-off mandrel.

4. The invention claimed in claim 1, wherein said cooling means is an air knife which operates with cooled air.

5. The invention claimed in claim 1, further comprising further cooling means acting in a peripheral direction from outside on said extruded tube which is wound with a multiple overlap.

6. The invention claimed in claim 1, including unwinding apparatus and a pressure-applying roller whereby one or more glass-fibre mats can be applied to said tube.

7. The invention claimed in claim 1, further including braiding apparatus to wind crossed-over reinforcing threads onto said tube.

8. The invention claimed in claim 1, including a further extruder having a slit extrusion nozzle to extrude a further sheet of synthetic plastics material onto said draw-off mandrel.

9. The invention claimed in claim 8, including between said extruder and said further extruder apparatus for applying reinforcing layers to said tube.

10. In apparatus for producing tubes by helically winding strips of thermoplastics synthetic sheet material, the combination comprising a double-shell coolable draw-off mandrel onto which said sheet material at a temperature at which it is fusible is wound spirally in overlappiing manner in such a way that it is formed into a tube with an obliquely extending winding seam, pull-off appartus to cause and permit axial and rotational movement of said tube relative to said draw-off mandrel, said pull-off apparatus comprising a caterpillar draw-off including individual drivable caterpillars, said individual drivable caterpillars being disposed at inervals around said draw-off mandrel and extending and being driven in an axial direction in relation to said draw-off mandrel, said caterpillars being mounted in a tubular shell which is mounted on bearings for rotation in a stationary housing, drive means for rotating said tubular shell and thus said caterpillars relative to said stationary housing, and cooling means to act directly on said sheet material wound into said tube on said mandrel.

11. The invention claimed in claim 10 wherein said drive means includes a gear ring carried by said tubular shell, said gear ring engaging and being driven by a rotating gear wheel mounted on said stationary housing.

12. The invention claimed in claim 10, further comprising a leader tube to draw-off said tube, said leader tube transmitting said rotational and axial movement and being located over said double-shell coolable draw-off mandrel, said tube being only initially attached to said leader tube and being removed therefrom after the apparatus is in full operation.

13. The invention claimed in claim 10, wherein said double-shell coolable draw-off mandrel is rotatably mounted, comprises an inner shell and an outer shell with a space therebetween and is supported on a central tube by hollow spokes, said central tube is constructed as a double tube, comprising an inner tube and an outer tube, said inner tube is connected to a coolant feed tube and said outer tube is connected to a coolant discharge tube, said inner tube communicating through first ones of said hollow spokes with said space and said space communicating through second ones of said hollow spokes with said outer tube of said central tube and said coolant discharge tube.

14. The invention claimed in claim 10, further comprising inner endless conveyor belts movable axially in relation to said draw-off mandrel, extending in the longitudinal direction around an outer shell of said draw-off mandrel and tensioned by a tensioning device, and second inner endless conveyor belts overlapping said first inner conveyor belts and extending in the longitudinal direction on the outer shell and tensioned by tensioning means, said first and said second inner endless conveyor belts being movable axially with respect to the draw-off mandrel, guide rollers within said draw-off mandrel to feed back said first and said second inner endless conveyor belts, said first and said second inner endless conveyor belts being driven by said pull-off apparatus directly or by way of said tube extruded thereon.

15. The invention claimed in claim 10, wherein said cooling means comprises a coolable roller which can be pressed against said draw-off mandrel.

16. The invention claimed in claim 10, wherein said cooling means comprises an air knife which operates with cooled air.

17. The invention claimed in claim 10, further comprising further cooling means acting in a peripheral direction from outside on said extruded tube which is wound with a multiple overlap.

18. The invention claimed in claim 10, including unwinding apparatus and a pressure-applying roller whereby one or more glass-fibre mats can be applied to said tube.

19. The invention claimed in claim 10, further including braiding apparatus to wind crossed-over reinforcing threads onto said tube.

20. The invention claimed in claim 10, including a further extruder having a slit extrusion nozzle to extrude a further sheet of synthetic plastics material onto said draw-off mandrel.

21. The invention claimed in claim 20, including between said extruder and said further extruder apparatus for applying reinforcing layers to said tube.

22. In apparatus for producing tubes by helically winding strips of thermoplastics synthetic sheet material, the combination comprising draw-off mandrel means onto which said sheet material at a temperature at which it is fusible is wound spirally in overlapping manner in such a way that it is formed into a tube with an obliquely extending winding seam, pull-off means to cause and permit rotational and radial movement of said tube relative to said draw-off mandrel means, said pull-off means comprising a plurality of material-engaging means spaced peripherally around said mandrel means and rotatably mounted to engage and advance the tube in an axial direction, said material-engaging means being mounted in a generally tubular housing, and means for rotating said housing about an axis generally concentric with the axis of said mandrel means, whereby said material-engaging means simultaneously rotate said tube and said mandrel means and move said tube axially along said mandrel means to a tube cutting station, cooling means for cooling said sheet material wound into said tube on said draw-off mandrel means, first inner endless conveyor belts movable axially in relation to said draw-off mandrel means and extending in the longitudinal direction around an outer shell of said draw-off mandrel means and tensioned by a tensioning device, and second inner endless conveyor belts overlapping said first inner conveyor belts and extending in the longitudinal direction on the outer shell and tensioned by tensioning means, said first and said second inner endless conveyor belts being movable axially with respect to said mandrel means, guide rollers within said mandrel means to feed back said first and said second inner endless conveyor belts being driven by said pull-off means directly or by way of said tube extruded thereon.

* * * * *